Aug. 10, 1943.   R. J. SCHAEDLER   2,326,396
SAFETY GOVERNOR FOR PNEUMATIC TOOLS
Filed Feb. 14, 1942   2 Sheets-Sheet 1
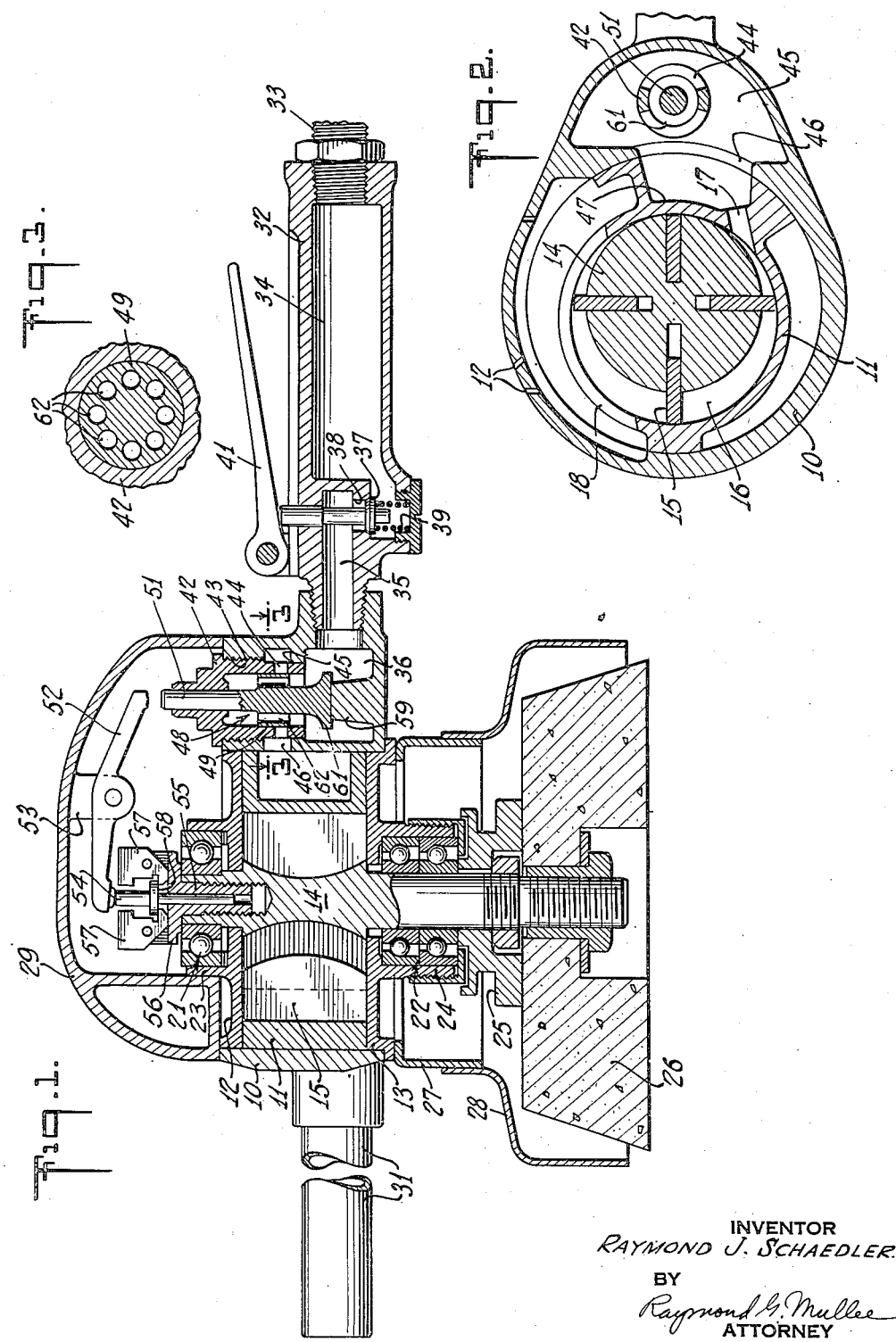
INVENTOR
RAYMOND J. SCHAEDLER.
BY
Raymond G. Mullee
ATTORNEY

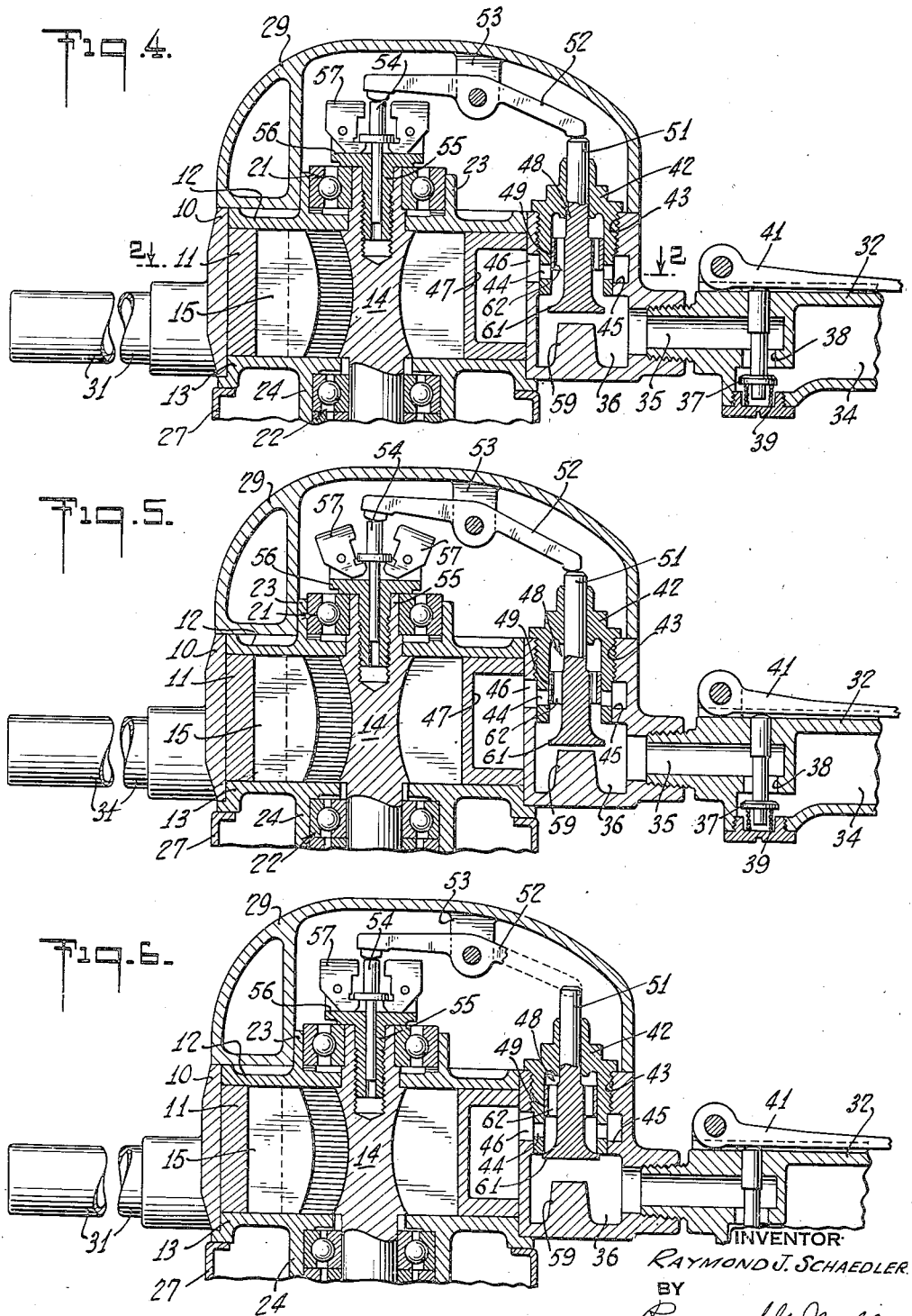

Patented Aug. 10, 1943

2,326,396

UNITED STATES PATENT OFFICE 2,326,396

SAFETY GOVERNOR FOR PNEUMATIC TOOLS

Raymond J. Schaedler, Cleveland, Ohio, assignor to Chicago Pneumatic Tool Company, New York, N. Y., a corporation of New Jersey Application February 14, 1942, Serial No. 430,869

11 Claims. (Cl. 121—34)

This invention relates to pneumatic tools and like devices, powered by pressure fluid operated rotary motors and controlled by governor apparatus limiting the free speed of the motor. More particularly the invention is concerned with an auxiliary safety feature by which operation of the motor automatically is discontinued when the governor apparatus is disabled, as by breakage.

To embody such a feature in a pressure fluid operated rotary tool is one object of the invention.

Another object of the invention is to control the supply of pressure fluid to a rotary motor by a governor valve operable to increase the supply of fluid to the motor as the pressure of a governor valve operating arm decreases within predetermined limits, and to cut off the air when the pressure of the operating arm is removed entirely.

Another object is to eliminate the use of springs in the control of the governor valve, and in general to provide a simple and sturdy, safety type, governor apparatus.

In accordance with these objects there is provided a governor valve operable in the conventional manner by motor controlled speed responsive mechanism, and formed with a primary valve head and an auxiliary valve head, the latter of which is held ineffective by the speed responsive mechanism, when operative, and moves to effective or closed position in the event of the speed responsive mechanism being disabled. A further feature of the invention resides in that said auxiliary valve head is arranged to operate as a poppet valve, being urged to closed position by the incoming live air which thereby provides a yielding pressure complementing the speed responsive mechanism in operating the governor valve.

Other objects and structural details of the invention will be apparent from the following description when read in conjunction with the accompanying drawings, wherein:

Fig. 1 is a view in longitudinal section of a portable pneumatic tool embodying the present invention, the parts being shown in the position they assume with the air shut off at its point of entrance to the tool.

Fig. 2 is a fragmentary view in cross section, taken along the line 2—2 of Fig. 4.

Fig. 3 is a fragmentary view in cross section, taken along the line 3—3 of Fig. 1.

Figs. 4 and 5 are fragmentary views, similar to Fig. 1, showing the tool in different stages of operation. In Fig. 4 the air has just been admitted to the tool, while in Fig. 5 the tool has attained a free speed.

Fig. 6 is a view similar to Figs. 4 and 5, in which the governor valve operating arm has broken and the auxiliary safety valve has moved to closed position.

Referring to Fig. 1, the invention is here disclosed as embodied in a portable grinding or like tool of the vertical type. In such a tool the abrasive wheel is arranged to present the surface of one side thereof to the work, while the motor housing is positioned above the wheel and horizontally extending handles are provided for the grasp of the operator.

The structure of the tool includes a casting 10 circular in shape throughout the greater part of its area but tapering in a right hand direction (as viewed in Figs. 1 and 2) to an area of reduced cross-section. Contained within a longitudinal opening in the casting 10 is a cylinder 11 closed at its opposite ends by plates 12 and 13. A rotor 14 is supported between the end plates 12 and 13 for rotation about an axis offset from the longitudinal axis of the cylinder 11. Slidably mounted in radial grooves in the rotor 14 are blades or vanes 15, which, in the operation of the motor, are urged outward into contact with the inner surface of cylinder 11. The eccentric mounting of the rotor 14 creates a crescent shaped chamber 16 in the cylinder 11 (see Fig. 2) which chamber receives live air at one end through a port 17. At its other end the chamber 16 is vented through a port 18 in the cylinder and ports 19 in the casting 10. The vanes 15 form pockets in the chamber 16, each pocket being connected in turn to the pressure fluid source and to exhaust as the rotor turns in response to the fluid pressure acting on the successive vanes.

The rotor 14 extends through and beyond each of the end plates 12 and 13, and, outside the plates, has a mounting in ball bearing assemblies 21 and 22, the latter being supported in outwardly facing annular flanges 23 and 24 in the respective end plates. The forward or lower end of the rotor passes through a spacing ring 25 and is threaded for direct connection to the abrasive wheel, in this instance a grinding cup 26. The projecting lower end of the rotor, and the grinding cup, are encircled by guard covers 27 and 28. The rear or upper end of the rotor 14 is adapted for connection to governor apparatus, and, together with such apparatus, is enclosed by a housing 29 fixed to the upper surface of casting 10. To aid in the support and manipulation of the tool a pair of handles 31 and 32 are secured to the casting 10 in a position at right angles to the longitudinal axis of the rotor 14.

Considering now in greater detail the manner in which live air is supplied to the motor, it will be noted that the handle 32 functions as a throttle handle, compressed air being supplied thereto through a coupling 33 connecting the tool to a pressure fluid conducting hose line (not shown). The interior of the handle 32 is made up of compartments 34 and 35 the former of which receives air directly through the coupling 33 and the latter of which opens through the inner end of the handle into a chamber 36 in the casing 10. Communication between the compartments 34 and 35 alternatively is cut off and established by a throttle valve 37 movable to open and closed positions with respect to a connecting port 38. A spring 39 maintains the valve 37 normally in closed position while a hand operated lever 41 is arranged to open the valve, acting when actuated to unseat the valve from its position closing the connecting port 38. In opening the throttle valve 37 a free flow of air is permitted from compartment 34 to compartment 35 and thence to chamber 36 and the motor. Closure of the throttle valve interrupts such flow and has the effect of discontinuing operation of the motor.

The chamber 36, supplied constantly with live air in the open position of the throttle valve 37, forms part of a pressure fluid supply passage, the terminus of which is marked by cylinder port 17 (Fig. 2). From chamber 36 the air flows upward into the open lower end of a bushing 42 secured by screw threads within a longitudinal bore 43. A set of radial ports 44 are formed in bushing 42 just above the lower end thereof and are adapted to be aligned with a horizontal shelf 45 surrounding the bore 43. An arcuate port 46 in the casting 10 connects shelf 45 to the opening containing cylinder 11, the cylinder being positioned with an external recess 47 thereof opposite the arcuate port. Port 17 is located in the recess 47 and conducts the air supplied thereto by way of ports 44, shelf 45 and port 46, to the motor.

As is customary in tools of this class a governor valve is provided for limiting the free speed of the motor independently of the throttle valve. The present governor valve embodies the safety feature of this invention and exercises its control through a variable restriction of the flow of pressure fluid through the ports 44 in the motor supply passage. The valve, indicated generally at 48, is mounted in the bushing 42 and comprises a circular head portion 49 and a stem portion 51. Valve head 49 has a sliding fit within the bushing and operates to increase and reduce the open area of the ports 44 and thereby vary the rate of flow of pressure fluid therethrough. The valve stem 51 extends through the closed upper end of the bushing and underlies one arm of an operating lever 52 by which the movement of the governor valve ordinarily is controlled. The lever 52 is pivotally connected at its mid-point to a lug 53 dependent from the inner surface of housing 29 and rocks about its pivot in response to speed variations of the motor. The end of the lever opposite to that cooperable with the governor valve overlies a plunger 54 coaxial with the rotor 14 and reciprocable within a rearward extension 55 of the rotor. An enlarged head 56 on the rotor extension 55 is transversely slotted to receive pivoted weights 57. The weights 57 engage an annular shoulder 58 on the plunger 54 in a manner to effect an axial rearward movement of the plunger in response to an outward rocking motion of the weights, which motion is accomplished by centrifugal force as the extension 55 turns with the rotor during operation of the motor. The extent of displacement of the weights 57, and therefore of the plunger 54, is of course determined by the speed of operation of the rotor 14 and varies in a direct relation with changes in such speed. The motor speed is in turn controlled by the intensity of the load imposed thereon and tends to increase sharply when the tool is lifted from the work, or otherwise wholly relieved of its load. The upper end of plunger 54 normally is in constant contact with the adjacent arm of lever 52 and turns the lever in a clockwise direction (Fig. 1) as the motor speed increases and permits it to return in the opposite direction as the motor speed decreases. Thus the lever 52 is caused to operate the governor valve 48, moving it positively toward closed position under the actuation of plunger 54 and controlling its movement toward open position.

According to the present invention, movement of the governor valve toward closed position is resisted by the pressure of the air flowing through the motor supply passage, which air acts on an exposed area of the valve in a direction urging the valve upward in the bushing 42. The stem 51 of the governor valve projects through the head portion 49 and into the chamber 36 where it is engageable with an abutment 59, defining its extreme limit of movement in one direction. On this projecting end of the valve stem 51, at a point below the lower end of bushing 42 is formed an auxiliary head 61. The lower surface of head 61 is acted upon by the pressure fluid passing from chamber 36 to the interior of bushing 42 with the result that the governor valve is urged upwards or in a direction to move the head 49 out of closed position with respect to the ports 44. The pressure above and below the valve head 49 is equalized by the provision of a set of longitudinal ports 62 therein (see Fig. 3).

The governor valve normally is controlled in its upward motion by the operating lever 52 but has an extreme limit of movement in that direction set by the engagement of auxiliary head 61 with the lower end of bushing 42. In effecting such engagement the head 61 acts as a poppet valve, closing the chamber 36 from communication with the interior of bushing 42 and thereby cutting off the supply of pressure fluid to the motor. By this means increased safety of operation is obtained since, should breakage occur at any point in the operating connection between the motor and the governor valve the motor will promptly be stopped even though the throttle valve continues to be held in open position. In prior art machines of this class any disabling of the governor mechanism resulted in an immediate rise in speed of the motor to a condition of unrestrained racing, this condition persisting until the throttle valve could be released. Such action often was the cause of injury to the operator or damage to the work, or both. The elements in the governor mechanism most subject to breakage are the arms of the lever 52 and the plunger 54, the latter sometimes breaking at a point immediately below the shoulder 58.

In the operation of the tool the parts normally assume the position shown in Fig. 1 where the throttle valve 37 is closed and the tool consequently is inactive. The supply of air to the chamber 36 being normally prevented the governor valve 48 is allowed to descend to its lower extreme of movement in which it rests on abutment 59. When applying the tool to the work the throttle control lever 41 is depressed and held in fully actuated position, further control of the pressure fluid being effected solely by the governor valve 48. As shown in Fig. 4, when the air first is admitted to the tool it is directed against the auxiliary valve head 61 and moves the governor valve upward to take up any lost motion in the connection between the valve and its operating mechanism. In the course of such movement the head 49 uncovers a substantial part of the ports 46 and air flows to the cylinder 11, initiating operation of the motor. The motor quickly gains a speed sufficient to start the centrifugally operated weights 57 moving outward and the governor valve thereby is forced toward closed position to reduce the rate of flow of pressure fluid to the motor. In Fig. 5 the opposed forces controlling the governor valve have reached a state of balance in which the valve restricts the motor to a safe free speed. During continued operation of the tool the governor valve moves to and from the position of Fig. 5 as the resistance to operation of the motor is increased and decreased. When the air supply is shut off, by the release of throttle lever 41, the motor stops and the governor valve is allowed to drop to the inactive position of Fig. 1.

It will be observed from Figs. 4 and 5 that the auxiliary valve head 61 of the governor valve normally is ineffective to exercise any restriction upon the air supply and functions merely as an impingement area for the pressure fluid urging the governor valve upward. In its motion to open position, therefore, the governor valve has two limits of travel, one set by the operating lever 52 and associated parts and the other defined by the engagement of valve head 61 with the lower end of bushing 42. In the former position the valve head 61 is ineffective to restrict the flow of air to the motor and attains its latter and effective position only upon breakage in the operating connection between the motor and governor valve. Such a condition of operation is shown in Fig. 6, where the lever 52 is illustrated in fragmentary form, as it would appear when broken. The governor valve, immediately upon being released from the control of the speed responsive mechanism, rises beyond its former range of movement until limited by the arrival of valve head 61 in closed position.

What is claimed is:

1. In a device of the class described having a pressure fluid operated motor, the combination of a governor valve exercising a variable restriction upon the supply of pressure fluid to said motor, pressure fluid means urging said valve in a direction to increase the supply of fluid to said motor, operating means for said governor valve controlled by said motor and adapted to press said valve in a direction to decrease the supply of fluid to said motor as the speed of said motor increases and to reduce the pressure on said valve as the speed of the motor decreases, said valve moving under the control of said operating means and said pressure fluid means in a direction to increase the supply of fluid to said motor as the pressure of said operating means decreases within predetermined limits, and means on said governor valve for cutting off the supply of fluid to said motor when the pressure of said operating means is removed.

2. In a device of the class described having a pressure fluid operated motor, the combination of a governor valve exercising a variable restriction upon the supply of pressure fluid to said motor, auxiliary means on said governor valve for restricting the supply of pressure fluid to said motor, said auxiliary means being ineffective within a predetermined range of movement of said valve, speed responsive mechanism operable by said motor for controlling said governor valve through said predetermined range of movement, and means for applying to said governor valve fluid pressure operable to move said governor valve outside said predetermined range of movement when said valve is released from the control of said speed responsive mechanism.

3. In a device of the class described having a pressure fluid operated motor and a pressure fluid supply passage leading thereto, the combination of a governor valve controlling the flow of fluid through said supply passage, a yielding means urging said valve in a first direction, operating means controlled by said motor for moving said valve in a second direction, said valve having a normal limit of movement in said first direction defined by said operating means and movable to and beyond said normal limit of movement upon the disabling of said operating means, and means enabled by a movement of said valve in said first direction to and beyond said normal limit of movement for closing said supply passage.

4. A device of the class described according to claim 3, characterized in that said last-named means comprises an auxiliary valve carried by said governor valve and held ineffective in the normal limits of movement of said governor valve.

5. In a device of the class described having a pressure fluid operated motor and a pressure fluid supply passage leading thereto, the combination of a governor valve controlling the flow of fluid through said supply passage and movable to and from a closed position with respect to said passage, an auxiliary valve controlling the flow of fluid through said supply passage and carried by said governor valve toward closed position as said governor valve moves toward open position, operating means controlled by said motor for moving said governor valve toward closed position and controlling its movement toward open position, said operating means acting when operative to prevent the movement of said auxiliary valve to closed position, and a yielding means urging said governor valve to open position and effecting closure of said auxiliary valve upon disabling of said operating means.

6. In a device of the class described having a pressure fluid operated motor and a pressure fluid supply passage leading thereto, the combination of a governor valve controlling the flow of fluid through said supply passage and movable to and from a closed position with respect to said passage, an auxiliary poppet type valve controlling the flow of fluid through said supply passage and carried by said governor valve toward closed position as said governor valve moves toward open position, said poppet valve being exposed to the pressure fluid in said supply passage which fluid acts thereon in a direction to urge said governor valve toward open position and said poppet valve toward closed position, and operating means controlled by said motor for moving said governor valve toward closed position and controlling its movement toward open position, said operating means acting when operative to prevent the movement of said auxiliary valve to closed position.

7. In a device of the class described having a pressure fluid operated motor, a supply passage leading thereto, and a throttle valve alternatively admitting and preventing the flow of pressure fluid into said supply passage; the combination of a governor valve controlling the flow of pressure fluid through said supply passage; pressure fluid means enabled and disabled by manipulation of said throttle valve for moving said governor valve toward open position; speed responsive mechanism operated by said motor for moving said governor valve toward closed position and defining a normal limit of movement of said valve toward open position beyond which said valve cannot move except upon breakage in said speed responsive mechanism; and means controlled by said governor valve for closing said supply passage upon movement of said governor valve beyond its normal limit of movement.

8. In a device of the class described having a pressure fluid operated motor, a supply passage leading thereto, and a throttle valve alternatively admitting and preventing the flow of pressure fluid into said supply passage; the combination of a governor valve controlling the flow of pressure fluid through said supply passage, said valve tending normally to occupy a closed position with respect to said supply passage; means responsive to the opening of said throttle valve for moving said governor valve to open position; speed responsive mechanism operable by said motor for moving said governor valve toward closed position and defining a normal limit of movement of said valve toward open position beyond which said valve cannot move except upon breakage in said speed responsive mechanism; and means controlled by said governor valve for closing said supply passage upon movement of said governor valve beyond its normal limit of movement.

9. In a device of the class described having a pressure fluid operated motor, a supply passage leading thereto, and a throttle valve alternatively admitting and preventing the flow of pressure fluid into said supply passage; the combination of a governor valve controlling the flow of pressure fluid through said supply passage; speed responsive mechanism operable by said motor to move said governor valve toward closed position and defining a normal limit of movement toward open position beyond which said valve cannot move except upon breakage in said speed responsive mechanism; auxiliary means controlled by said governor valve for closing said supply passage upon movement of said governor valve beyond its normal limit of movement; and means responsive to the opening of said throttle valve for moving said governor valve to open position, said means cooperating with said speed responsive mechanism to control movement of said governor valve and acting to move said valve beyond its normal limit of movement upon removal of the pressure of said speed responsive mechanism.

10. In a device of the class described having a pressure fluid operated motor, a supply passage leading thereto, and a throttle valve alternatively admitting and preventing the flow of pressure fluid into said supply passage; the combination of a governor valve controlling the flow of pressure fluid through said supply passage and normally occupying a position closing said passage; speed responsive mechanism operable by said motor for moving said governor valve toward closed position and defining a normal limit of movement of said valve toward open position beyond which said valve cannot move except upon breakage in said speed responsive mechanism; auxiliary means controlled by said governor valve for closing said supply passage upon movement of said governor valve beyond its normal limit of movement; and means responsive to the opening of said throttle valve for moving said governor valve to open position, said means cooperating with said speed responsive mechanism to control movement of said governor valve and acting to move said valve beyond its normal limit of movement upon removal of the pressure of said speed responsive mechanism.

11. In a device of the class described having a pressure fluid operated motor and a supply passage leading thereto; a governor valve controlling the flow of pressure fluid through said supply passage; speed responsive mechanism operable by said motor for moving said valve toward closed position and defining a normal limit of movement of said valve toward open position beyond which it cannot move except upon breakage in said speed responsive mechanism, said governor valve normally occupying a position closing said supply passage and out of cooperative relation with said speed responsive mechanism; means for applying fluid pressure to said governor valve in a direction to move said valve to open position and into cooperative relation with said speed responsive mechanism, said means acting to move said valve beyond its normal limit of movement upon removal of the pressure of said speed responsive mechanism; and means controlled by said governor valve for closing said supply passage in response to movement of said valve beyond a normal limit defined by said speed responsive mechanism.

RAYMOND J. SCHAEDLER.